(12) United States Patent
Takaishi

(10) Patent No.: US 10,998,650 B2
(45) Date of Patent: May 4, 2021

(54) GROUNDING TERMINAL AND WIRE HARNESS

(71) Applicant: Sumitomo Wiring Systems, Ltd., Mie (JP)

(72) Inventor: Daisuke Takaishi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/784,433

(22) Filed: Feb. 7, 2020

(65) Prior Publication Data
US 2020/0266558 A1 Aug. 20, 2020

(30) Foreign Application Priority Data
Feb. 14, 2019 (JP) .............................. JP2019-024712

(51) Int. Cl.
| | | |
|---|---|---|
| *H01R 4/60* | (2006.01) | |
| *H01R 4/72* | (2006.01) | |
| *H01R 4/18* | (2006.01) | |
| *H01R 13/03* | (2006.01) | |
| *B60R 16/02* | (2006.01) | |
| *H01R 11/12* | (2006.01) | |

(52) U.S. Cl.
CPC ............ *H01R 4/72* (2013.01); *B60R 16/0215* (2013.01); *H01R 4/185* (2013.01); *H01R 11/12* (2013.01); *H01R 13/03* (2013.01); *H01R 2201/26* (2013.01)

(58) Field of Classification Search
CPC .......... H01R 4/18; H01R 4/185; H01R 4/188; H01R 4/184; H01R 43/048

USPC ................................. 439/203, 877, 879, 887
See application file for complete search history.

(56) References Cited

U.S. PATENT DOCUMENTS

| | | | |
|---|---|---|---|
| 8,245,396 B2* | 8/2012 | Kondo | H01R 13/035 29/863 |
| 9,391,384 B2* | 7/2016 | Kodama | H01R 4/62 |
| 9,991,608 B2* | 6/2018 | Trafton | H01R 4/184 |
| 2011/0225820 A1* | 9/2011 | Kondo | H01R 43/048 29/863 |
| 2014/0230996 A1 | 8/2014 | Saito | |

(Continued)

FOREIGN PATENT DOCUMENTS

JP 2013-114936 A 6/2013

*Primary Examiner* — Phuong Chi Thia Nguyen
(74) *Attorney, Agent, or Firm* — Abelman, Frayne & Schwab

(57) ABSTRACT

Provided is a grounding terminal comprising a terminal fitting including a crimp portion, and a fastened portion that is provided on the front lower side of the crimp portion and is to be connected to a grounding surface using a fastening member, the terminal fitting being provided with a stepped portion between the crimp portion and the fastened portion. A covering layer is configured to be formed on the grounding terminal by thermally shrinking a heat-shrinkable tube including, on its inner circumferential portion, a water sealing agent to be used to cover at least the crimp portion of the terminal fitting and seal the electric wire from water. A water sealing agent is configured to be distributed up to the front side with respect to the covering layer as viewed from above, and a hanging-down length d of a water sealing agent is within the range of the stepped portion.

16 Claims, 5 Drawing Sheets

(56) References Cited

U.S. PATENT DOCUMENTS

2014/0302729 A1* 10/2014 Kodama ................ H01R 43/16
439/877
2018/0158569 A1* 6/2018 Yoshida ................... H01R 4/62

* cited by examiner

GROUNDING TERMINAL AND WIRE HARNESS

CROSS-REFERENCE TO RELATED APPLICATIONS

This application is based on and claims priority from Japanese Patent Application No. 2019-024712, filed on Feb. 14, 2019, with the Japan Patent Office, the disclosure of which is incorporated herein in its entirety by reference.

TECHNICAL FIELD

The present invention relates to a grounding terminal and a wire harness.

BACKGROUND

Wire harnesses to be used in vehicles such as automobiles may include a grounding terminal to be connected to a grounding surface of a vehicle body panel or the like. The infiltration of water into an electric wire to which the grounding terminal is connected needs to be suppressed, even if water comes into contact with the grounding terminal of this type of wire harness when a vehicle is subjected to high-pressure washing, for example.

As a method for suppressing the infiltration of water into an electric wire in a terminal-equipped electric wire, as disclosed in Japanese Patent Laid-open Publication No. 2013-114936, for example, waterproofing may be performed by attaching a heat-shrinkable tube provided with an adhesive thereinside to an electric connection portion where the terminal of the terminal-equipped electric wire and the electric wire are electrically connected to each other and melting the adhesive. In Japanese Patent Laid-open Publication No. 2013-114936, an attempt is made to prevent the leakage of the adhesive and reliably fill the adhesive in the heat-shrinkable tube up to the open end by using a jig configured to hold the heat-shrinkable tube between an upper frame and a lower frame to arrange the heat-shrinkable tube at a predetermined position of the electric connection portion.

SUMMARY

When a water sealing structure is formed by arranging a heat-shrinkable tube provided with a water sealing agent such as an adhesive on the inner circumferential portion at the connection portion where the grounding terminal and the electric wire are connected to each other and melting the water sealing agent, water sealing performance may vary among many individual parts in which the water sealing structure has been formed. The reason for this is that the leading end portion of the electric wire conductor cannot be sufficiently covered with the water sealing agent in some cases. In Japanese Patent Laid-open Publication No. 2013-114936, a jig having a special shape is used to prevent the leakage of the adhesive, and a hot melt adhesive solidifies such that an opening at one end portion of the heat-shrinkable tube is blocked by a blocking surface as shown in FIG. 9 and the like. In the case where the water sealing agent can only reach the end position of the heat-shrinkable tube in this manner, even if the leading end portion of the electric wire conductor is insufficiently covered with the water sealing agent in the region inside the heat-shrinkable tube due to manufacturing variation, it is difficult to visually confirm that the leading end portion is insufficiently covered with the water sealing agent by observing the external appearance from the outside of the heat-shrinkable tube.

On the other hand, FIG. 10 in Japanese Patent Laid-open Publication No. 2013-114936 shows an example of a conventional jig. This jig has a structure with which a molten water sealing agent can reach the outside of the opening of a heat-shrinkable tube. In this case, it is possible to confirm that the leading end portion of the electric wire conductor is covered with a sufficient amount of water sealing agent by observing if the water sealing agent reaches the outside of the opening of the heat-shrinkable tube. As is this case, the fact that a molten water sealing agent reaches the leading end portion of the heat-shrinkable tube becomes an indication that the water sealing agent will succeed in providing high water sealing performance to the electric wire, but the molten water sealing agent not only reaches the leading end portion of the heat-shrinkable tube but also may hang down from the heat-shrinkable tube and solidify in that state. In this case, when the grounding terminal is connected to the grounding surface using a fastening member, the water sealing agent that hangs down and solidifies inhibits reliable fastening in a state in which the grounding terminal is brought into contact with the grounding surface in a planar manner, and thus the bearing surface of the grounding terminal may become loose. As described above, it is difficult to reliably cover the connection portion where the grounding terminal and the electric wire are connected to each other with the water sealing agent as well as to suppress the looseness of the bearing surface of the grounding terminal caused by the water sealing agent that hung down.

The solution to this problem by the present invention is to provide a grounding terminal in which a water sealing agent layer is provided on a connection portion where the grounding terminal and an electric wire are connected to each other, and a wire harness including such a grounding terminal. With this grounding terminal, it is possible to sufficiently cover the connection portion where the grounding terminal and the electric wire are connected to each other with the water sealing agent as well as to suppress the looseness of the bearing surface of the grounding terminal caused by the water sealing agent that hangs down when the ground connection is established.

In order to solve the foregoing problems, a grounding terminal according to the present invention includes a terminal fitting including a crimp portion for crimping and fixing an electric wire, and a fastened portion that is provided on the front lower side of the crimp portion and is to be connected to a grounding surface using a fastening member, the terminal fitting being provided with a stepped portion between the crimp portion and the fastened portion, wherein a covering layer is configured to be formed by thermally shrinking a heat-shrinkable tube including, on its inner circumferential portion, a water sealing agent to be used to cover at least the crimp portion of the terminal fitting and seal the electric wire from water, the water sealing agent is configured to be distributed up to the front side with respect to the covering layer as viewed from above, and a hanging-down length of the water sealing agent is within the range of the stepped portion.

Here, it is preferable that the hanging-down length of the water sealing agent is 5.0 mm or smaller. It is preferable that the height of the stepped portion is 6.0 mm or smaller. It is preferable that the distance between the crimp portion and the stepped portion is 10 mm or greater. It is preferable that the water sealing agent is used in such an amount that the water sealing agent housed on the inner circumferential portion of the covering layer has a thickness of 0.5 mm or greater and 1.5 mm or smaller.

It is preferable that the cross-sectional area of a conductor of the electric wire is 2 mm² or greater and 20 mm² or smaller as a nominal cross-sectional area. It is preferable that the thickness of a metal material constituting the terminal fitting is 0.5 mm or greater and 3.0 mm or smaller.

It is preferable that the water sealing agent is made of a hot melt adhesive. It is preferable that the heat-shrinkable tube contains a crosslinked polyolefin. It is preferable that the covering layer is obtained by thermally shrinking the heat-shrinkable tube at a shrinkage ratio of 1% or more and 30% or less.

It is preferable that the terminal fitting is made of a metal material including a tin plating layer on its surface. It is preferable that the terminal fitting includes only one fastened portion.

It is preferable to use the grounding terminal in an automobile. It is preferable to use the grounding terminal without stacking the fastened portions of a plurality of the grounding terminals.

A wire harness according to the present invention includes: the grounding terminal as mentioned above; and an electric wire, wherein an end portion of the electric wire is crimped and fixed with the crimp portion of the grounding terminal, and is covered with the covering layer.

Here, it is preferable that a plurality of the electric wires are crimped together using the crimp portion.

In the above-mentioned grounding terminal according to the present invention, the water sealing agent is distributed up to the front side of the covering layer obtained by shrinking the heat-shrinkable tube as viewed from above. Accordingly, by observing the external appearance, it is possible to confirm that the water sealing agent is reliably filled in the region inside the covering layer including a portion corresponding to the front end edge of the covering layer, and sufficiently covers the connection portion where the grounding terminal and the electric wire are connected to each other. In the terminal fitting, the stepped portion is provided between the crimp portion and the fastened portion, and therefore, the water sealing agent is less likely to reach a position as high as the fastened portion even if the water sealing agent hangs down to the outside of the covering layer. In addition, the hanging-down length of the water sealing agent is limited so as to be within the range of the stepped portion in the terminal fitting. Therefore, the water sealing agent that hangs down is less likely to inhibit the connection of the fastened portion to the grounding surface, and thus the looseness of the bearing surface caused by the water sealing agent that hangs down is less likely to occur.

Here, in the case where the hanging-down length of the water sealing agent is 5.0 mm or smaller, the looseness of the grounding terminal caused by the water sealing agent that hangs down is particularly likely to be suppressed.

In the case where the height of the stepped portion is 6.0 mm or smaller, it is possible to prevent an excessive increase in size of the grounding terminal, improve space-saving properties, and reduce the cost of materials required for the formation of the stepped portion.

In the case where the distance between the crimp portion and the stepped portion is 10 mm or greater, the distance from the crimp portion to the stepped portion is secured, and thus the leading end portion of the electric wire conductor protruding toward the front side of the crimp portion is sufficiently covered with the covering layer and the water sealing agent layer, thus making it possible to provide high water sealing performance to the electric wire.

In the case where the water sealing agent is used in such an amount that the water sealing agent housed on the inner circumferential portion of the covering layer has a thickness of 0.5 mm or greater and 1.5 mm or smaller, the water sealing agent in such a sufficient amount that the water sealing agent can be distributed up to the front side of the covering layer can be easily arranged in a region including the crimp portion. On the other hand, it is possible to suppress a case where an excessive amount of water sealing agent hangs down while the heat-shrinkable tube is shrunk, and the hanging-down length increases.

In the case where the cross-sectional area of the conductor of the electric wire is 2 mm² or greater and 20 mm² or smaller as a nominal cross-sectional area, or a metal material constituting the terminal fitting has a thickness of 0.5 mm or greater and 3.0 mm or smaller, the terminal fitting is designed to include the stepped portion between the crimp portion and the fastened portion, based on the shape and size of a grounding terminal that is generally used as a grounding terminal to be connected to the electric wire in which a conductor has such a cross-sectional area or a grounding terminal having such a thickness, thus making it possible to effectively suppress the looseness of the bearing surface of the grounding terminal caused by the water sealing agent that is arranged in the crimp portion and hangs down. In addition, it is easy to cover the leading end portion of the electric wire with a sufficient amount of water sealing agent and thus improve water sealing performance.

In the case where the water sealing agent is constituted by a hot melt adhesive, it is easy to form a water sealing layer with high water sealing performance by cooling and solidifying the hot melt adhesive that has been melted through heating. In addition, heating the heat-shrinkable tube in which a hot melt adhesive is arranged on the inner circumferential portion makes it possible to simultaneously and simply achieve the formation of the covering layer through the heat-shrinkage of the heat-shrinkable tube and the formation of the water sealing layer through melting of the hot melt adhesive.

In the case where the heat-shrinkable tube includes a crosslinked polyolefin, the heat-shrinkable tube exhibits excellent heat-shrinkable properties.

In the case where the covering layer is formed by thermally shrinking the heat-shrinkable tube at a shrinkage ratio of 1% or more and 30% or less, the heat-shrinkable tube can be brought into areal contact with the crimp portion via the water sealing agent, thus making it possible to form the covering layer that exhibit high protective performance with respect to the water sealing layer, which is formed through the solidification of the water sealing agent, and the crimp portion. On the other hand, it is possible to suppress a case where the heat-shrinkable tube is excessively shrunk, and thus a large amount of water sealing agent is squeezed out and hangs down during shrinking.

In the case where the terminal fitting is made of a metal material including a tin plating layer on its surface, the terminal fitting can be made using a material that is widely used in electric connection terminals.

In the case where the terminal fitting includes only a single fastened portion, it is possible to obtain a grounding terminal whose space-saving properties and cost-reducing effect are particularly excellent.

In the case where the grounding terminal is used in an automobile, even if water attaches to the terminal fitting due to high-pressure washing performed on the automobile, or the like, it is possible to effectively suppress the infiltration of water into the electric wire since the covering layer formed by thermally shrinking a heat-shrinkable tube provided with a water sealing agent on the inner circumferential portion is formed on the connection portion where the terminal fitting and the electric wire are connected to each other, and the end portion of the electric wire is covered with the water sealing agent. In addition, the looseness of the bearing surface of the grounding terminal caused by the water sealing agent that hangs down is suppressed due to the formation of the stepped portion in the terminal fitting and the limitation of the hanging-down length of the water sealing agent, thus making it possible to very reliably establish the ground connection to a vehicle body panel or the like.

In the case where the grounding terminal is used without stacking a plurality of fastened portions of grounding terminals, it is possible to particularly improve the fastening stability of the fastened portion of the grounding terminal due to not only this effect but also the effect of being capable of suppressing the looseness of the bearing surface of the grounding terminal due to the formation of the stepped portion in the terminal fitting and the limitation of the hanging-down length of the water sealing agent.

In the case of the wire harness according to the present invention, it is confirmed that the end portion of the electric wire is sufficiently covered with the water sealing agent by checking if the water sealing agent is distributed up to the front side of the covering layer that covers the crimp portion with which the electric wire is crimped and fixed. The formation of the stepped portion between the crimp portion and the fastened portion in the terminal fitting, and the limitation of the hanging-down length of the water sealing agent makes it possible to suppress the looseness of the bearing surface of the grounding terminal caused by the water sealing agent that hangs down.

Here, in the case where a plurality of electric wires are crimped together with the crimp portion, the water sealing agent arranged in the region including the crimp portion with which the electric wires are crimped together can suppress the infiltration of water into the electric wires crimped together. In addition, it is possible to suppress the looseness of the bearing surface of the grounding terminal and to very reliably establish ground connections of the electric wires.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1A is a see-through side view, and FIG. 1B is a see-through plan view.

FIG. 2A is a side view, and FIG. 2B is a plan view.

DETAILED DESCRIPTION

Figure 1A:
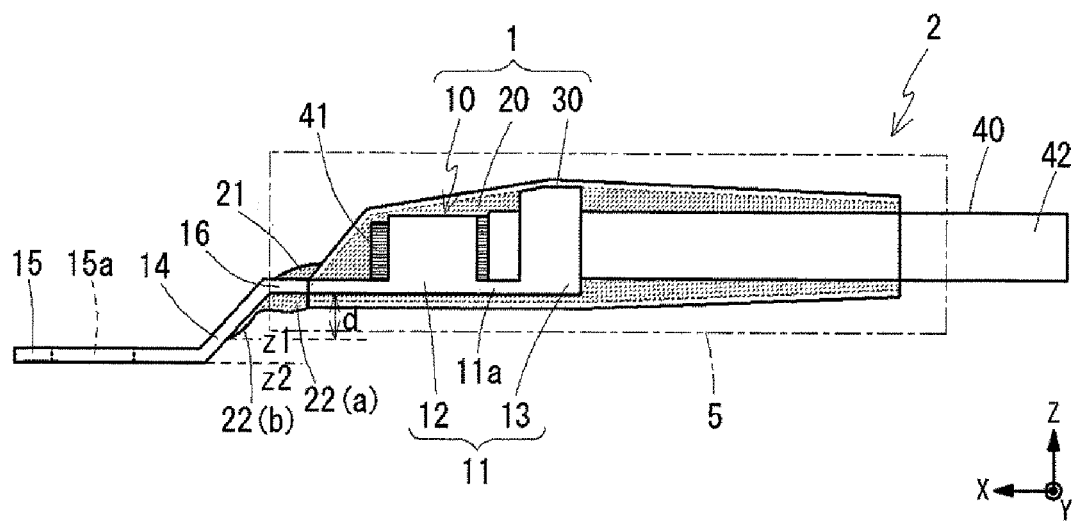
FIGS. 1A and 1B show diagrams illustrating the structure near the end portion of a wire harness including a grounding terminal according to an embodiment of the present invention.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, embodiments of the present invention will be described with reference to the drawings. It should be noted that, in all the diagrams, similar constituent elements are denoted by similar reference numerals, and the descriptions are omitted as appropriate.

Details of a grounding terminal and a wire harness according to embodiments of the present invention will be described with reference to the drawings. A wire harness according to an embodiment of the present invention is obtained by connecting a grounding terminal according to an embodiment of the present invention to the end portion of an electric wire.

The grounding terminal according to this embodiment includes a terminal fitting including a crimp portion for crimping and fixing an electric wire, and a fastened portion that is provided on the front lower side of the crimp portion and is to be connected to a grounding surface using a fastening member, the terminal fitting being provided with a stepped portion between the crimp portion and the fastened portion, wherein a covering layer is configured to be formed by thermally shrinking a heat-shrinkable tube including, on its inner circumferential portion, a water sealing agent to be used to cover at least the crimp portion of the terminal fitting and seal the electric wire from water, the water sealing agent is configured to be distributed up to the front side with respect to the covering layer as viewed from above, and a hanging-down length of the water sealing agent is within the range of the stepped portion.

The inventors of the present invention investigated the variation in water sealing performance of mass-produced grounding terminals. As a result, it was found that some of the ground terminals were not sufficiently sealed from water. At first, the inventors of the present invention considered that ground terminals that are not sufficiently sealed from water would be eliminated merely by increasing the amount of water sealing agent. As a result, the inventors of the present invention found an issue where the water sealing agent hangs down, runs along the grounding terminal, and flows into a fastened portion of the grounding terminal in the case where the amount of water sealing agent is increased. Accordingly, when the fastened portion is fixed using a grounding bolt, the grounding terminal may become loose. In addition, while the fastened portion of the grounding terminal is being fixed, the water sealing agent comes off, and thus the water sealing performance deteriorates.

The inventors of the present invention investigated a method in which a water sealing material in an amount comparable to the amount of water sealing material used in conventional products is used to provide sufficient water sealing performance while suppressing the hanging down of the water sealing material. As a result, it was found that it is important to adjust the position and temperature of a heat-shrinkable tube while it is being shrunk, and thus the grounding terminal of this embodiment was completed.

[Outlines of Grounding Terminal and Wire Harness]

Figure 1B:
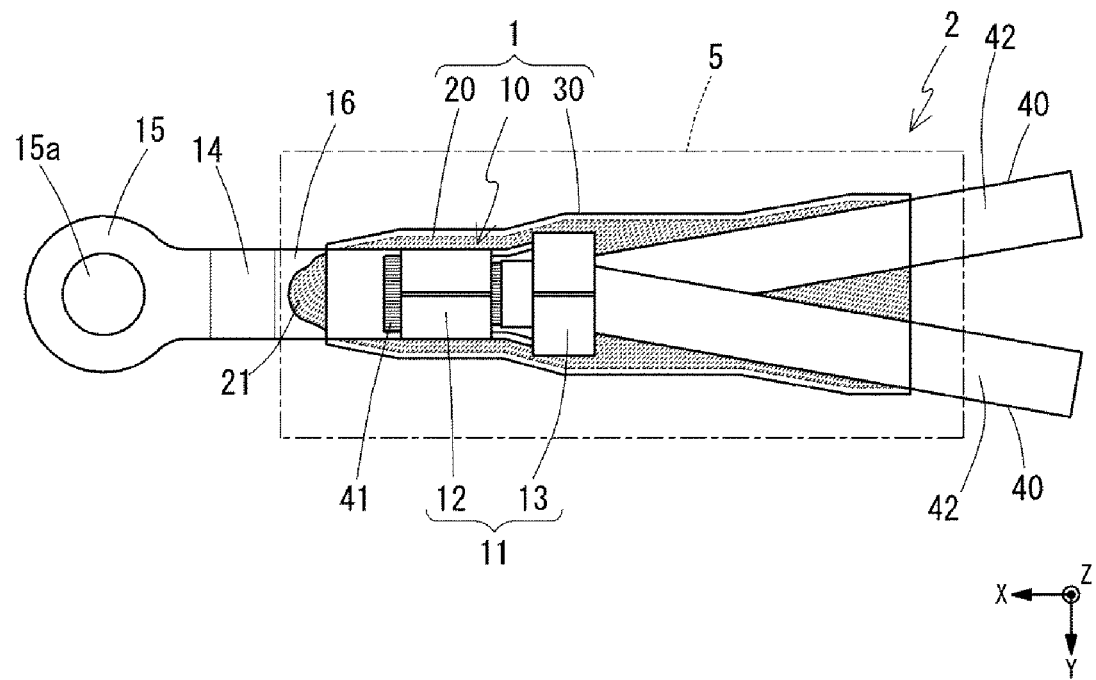
Figure 2A:
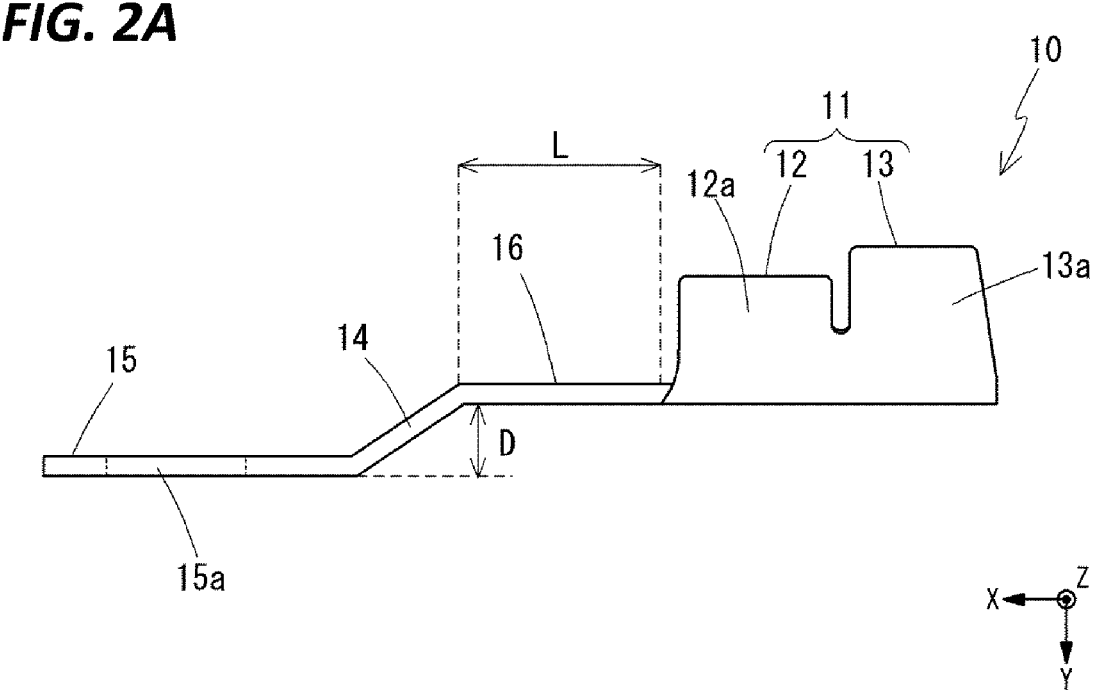
FIGS. 2A and 2B show diagrams illustrating a terminal fitting of the grounding terminal.
Figure 2B:
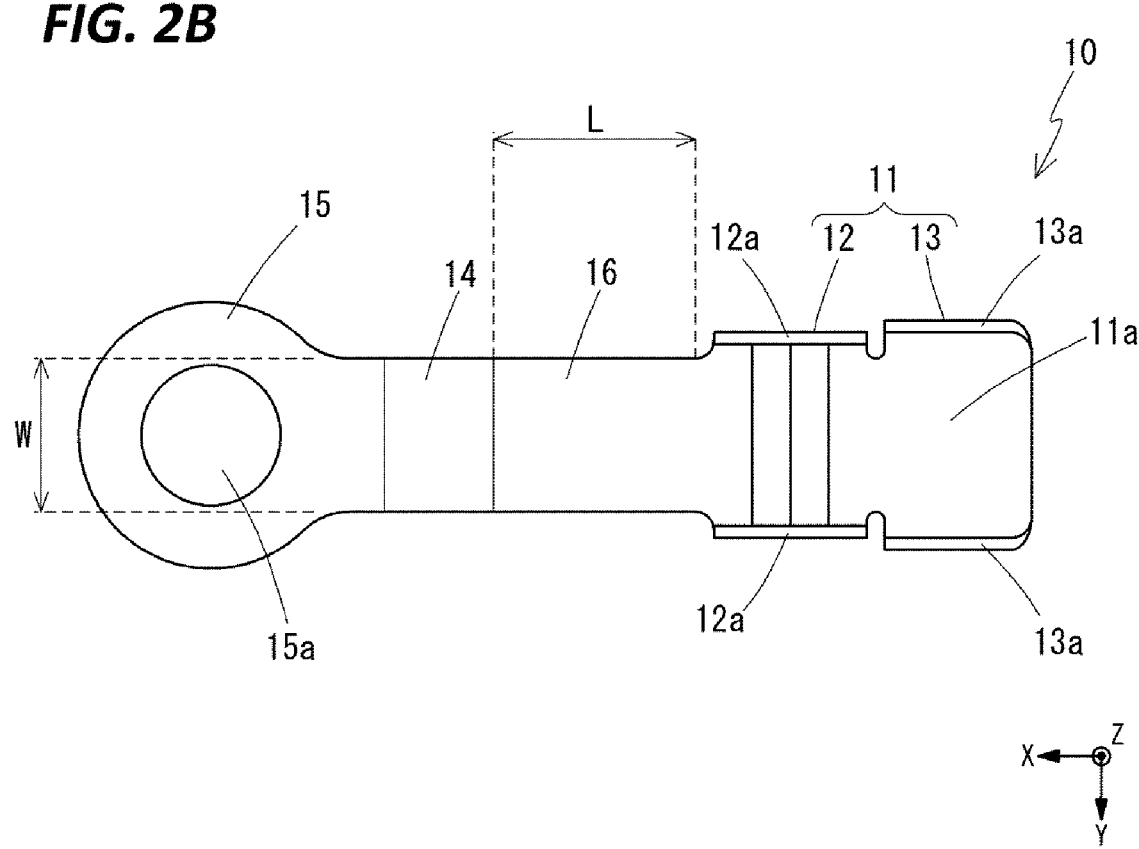

FIGS. 1A and 1B show a schematic structure of a wire harness 2 including a grounding terminal 1 according to an embodiment of the present invention. FIGS. 2A and 2B show a schematic structure of a terminal fitting 10 included in the grounding terminal 1. In this specification, the longitudinal direction of the grounding terminal 1 is taken as the front-rear direction (x direction). A side that is to be connected to a grounding surface is taken as the front side (+x side), and a side to which an electric wire 40 is connected is taken as the rear side (−x side). A side of a bottom surface 11a of the terminal fitting 10 on which the electric wire 40 is placed is taken as the upper side (+z side), and a side opposite to the upper side is taken as the lower side (−z side). A direction orthogonal to the front-rear direction (x direction) and the vertical direction (z direction) is taken as the width direction (y direction).

The grounding terminal 1 includes a terminal fitting 10, a water sealing layer 20, and a covering layer 30. The electric wire 40 that constitutes the wire harness 2 together with the grounding terminal 1 includes a conductor 41 and an insulating coating 42.

First, materials of these members will be briefly described. The terminal fitting 10 included in the grounding terminal 1 is made of a metal material. A specific favorable example thereof is a tinned material that is obtained by applying tin plating on a metal base material made of copper, a copper alloy, or the like and is widely used as a constituent material of an electric connection terminal, but there is no particular limitation thereto.

The water sealing layer 20 is made of a water sealing agent that can be used to cover the leading end portion of the electric wire 40 and thus seal the electric wire 40 from water, that is, a polymer material that can prevent the infiltration of water into the electric wire 40. The water sealing layer 20 contains a thermoplastic resin. In particular, a hot melt adhesive that is one type of adhesive made of a thermoplastic resin can be particularly favorably used as the water sealing agent. It should be noted that, in this specification, the polymer material refers to a material containing a polymer as a main component, that is, a material in which a polymer makes up 50 mass % or more of all the components.

The covering layer 30 is provided to cover the outer circumference of the water sealing layer 20, and is made of thermally shrunk polymer material having heat-shrinkable properties. Specifically, the polymer material preferably contains a crosslinked polyolefin, which is a polymer having excellent heat-shrinkable properties, but there is no particular limitation thereto.

Figure 4:
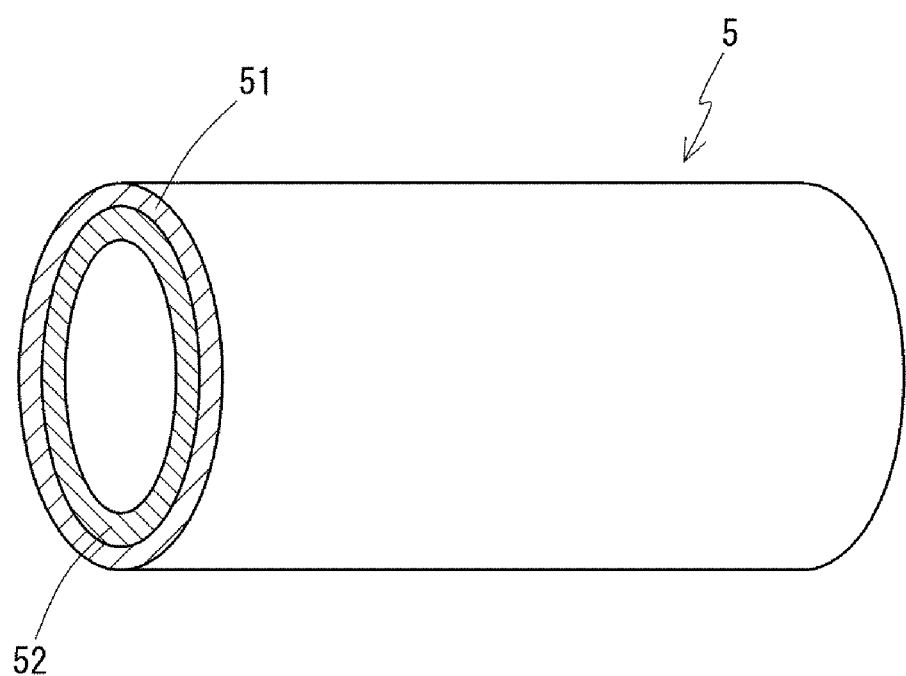
FIG. 4 is a perspective view of a heat-shrinkable tube to be arranged on the grounding terminal.

More specifically, the covering layer 30 is made of a thermally shrunk heat shrinkable tube provided with the water sealing agent for forming the water sealing layer 20 on the inner circumferential portion. FIG. 4 shows an example of such a heat-shrinkable tube with a water sealing agent 5. An inner layer 52 containing a substance such as a hot melt adhesive that may function as the water sealing agent is formed on the inner circumferential surface of the heat-shrinkable tube 51 (outer layer) that is formed in a tubular shape and contains a heat-shrinkable material such as a crosslinked polyolefin. As described in detail later as a method for manufacturing the wire harness 2, by heating such a heat-shrinkable tube with a water sealing agent 5, the covering layer 30 is formed through thermal shrinkage of the heat-shrinkable tube 51, which is the outer layer, and the water sealing layer 20 is formed inside the covering layer 30 through melting and solidification of the material constituting the inner layer 52.

The conductor 41 included in the electric wire 40 is constituted by a plurality of metal strands. The plurality of metal strands may be bundled together or twisted together. Examples of the material of the metal strands include copper, copper alloys, aluminum, and aluminum alloys. The insulating coating 42 includes a layer of an insulating polymer material that covers the outer circumference of the conductor 41. Examples of the constituent material of the insulating coating 42 include rubbers, polyolefins, polyvinyl chloride (PVC), and thermoplastic elastomers.

Next, the structure of the terminal fitting 10 will be described. The terminal fitting 10 includes a crimp portion 11, an oblique portion 14, and a fastened portion 15, which are arranged in that order from the rear side. The entire terminal fitting 10 is formed as single body, and the crimp portion 11 and the fastened portion 15 are integrally continuous with each other with the oblique portion 14 being provided therebetween.

The crimp portion 11 is a portion for crimping the electric wire 40 and fixing it to the terminal fitting 10. The crimp portion 11 includes a first crimp portion 12 and a second crimp portion 13. As shown in FIGS. 2A and 2B, the first crimp portion 12 is provided on the front side, and the second crimp portion 13 is provided on the rear side. The first crimp portion 12 and the second crimp portion 13 are connected to each other by the bottom surface 11a, which is shared thereby. The first crimp portion 12 includes first crimp pieces 12a that extend outward from the two sides of the bottom surface 11a in the width direction, and the second crimp portion 13 includes second crimp pieces 13a that extend outward from the two sides of the bottom surface 11a in the width direction. The bottom surface 11a extends toward the front side with respect to the positions at which the first crimp pieces 12a are provided, and a portion located on the front side with respect to the first crimp portion 12 is a planar portion 16. It should be noted that the crimp portion 11 may have a configuration in which the first crimp portion 12 is not included as in the case of a terminal fitting 10' shown in FIG. 3, for example. In this case, a portion of the bottom surface 11a having a length sufficient enough to weld the conductor 41 of the electric wire 40 thereto using ultrasonic welding or the like need only be secured on the front side with respect to the second crimp portion 13.

The fastened portion 15 is a portion to be used to connect the terminal fitting 10 to a grounding surface (connection surface having a grounding potential). The fastened portion 15 is formed at a position that is located on the front side with respect to the crimp portion 11 and below the crimp portion 11, and a stepped portion indicated by a height D in the diagrams is provided between the crimp portion 11 and the fastened portion 15.

The fastened portion 15 is formed in a flat shape, and its surface is substantially parallel with the bottom surface 11a of the crimp portion 11. The fastened portion 15 is provided with a through hole 15a into which a fastening member such as a bolt can be inserted. It should be noted that there is no limitation to the through hole 15a as long as a structure into which the fastening member can be inserted is provided. For example, a cutout that is open at the front end edge of the fastened portion 15 may be provided instead of the through hole 15a. Also, from the viewpoint of securing the strength of the fastened portion 15, a flange that is formed as a single body with the fastened portion 15 may also rise from the edge of the fastened portion 15 (not shown).

The oblique portion 14 connects the front end portion of the planar portion 16 provided on the front side of the crimp portion 11 and the rear end portion of the fastened portion 15. Since the fastened portion 15 is provided below the crimp portion 11, and the stepped portion is formed between the fastened portion 15 and the crimp portion 11, the oblique portion 14 is formed as an oblique surface that extends downward from the rear side to the front side.

Figure 3:
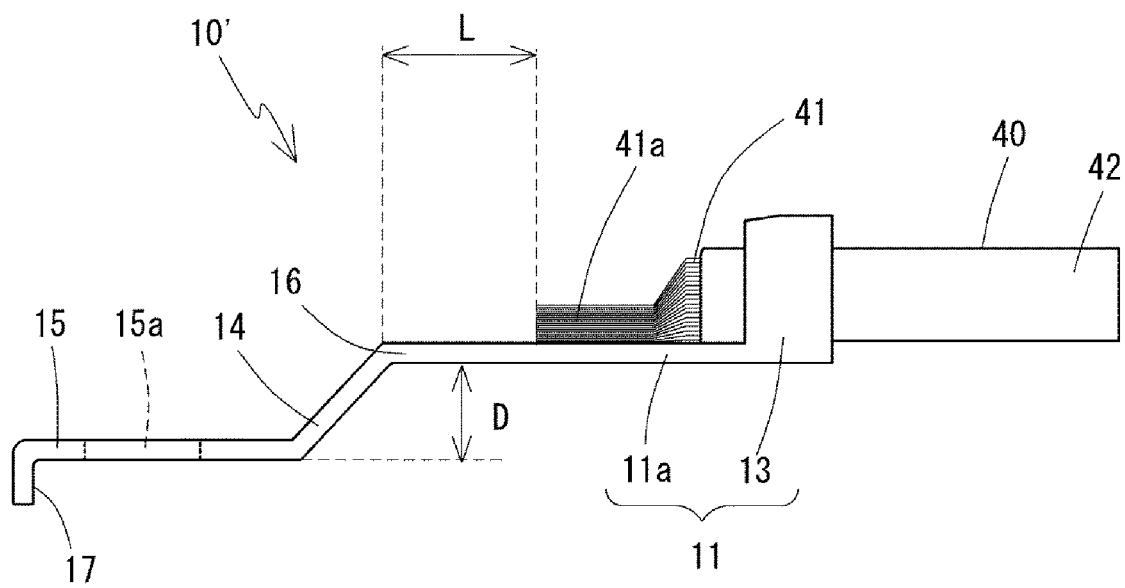
FIG. 3 is a side view illustrating a state in which an electric wire is connected to a terminal fitting according to another embodiment.
Figure 3:
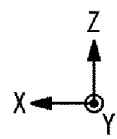

Furthermore, as shown in FIG. 3, the terminal fitting 10 may also be provided with a detent 17 on the front side with respect to the fastened portion. The detent 17 is formed as a single body with the fastened portion 15, and protrudes downward from the front end of the fastened portion. When a fastening member is inserted into the through hole 15a of the fastened portion 15 to connect the terminal fitting 10 to the grounding surface, locking the detent 17 to the edge or groove structure provided on the grounding surface makes it possible to suppress the rotation of the grounding terminal 10 during the connection operation and thus improve the workability thereof.

The terminal fitting 10 having the structure as described above is connected to the end portion of the electric wire 40. At the end portion of the electric wire 40, the insulating coating 42 is removed, and the conductor 41 is exposed. The end portion of the electric wire 40 is crimped with the crimp portion 11 and is fixed to the terminal fitting 10. At this time, the exposed conductor 41 is crimped with the first crimp portion 12, which is located on the front side, and a portion in which the conductor 41 is covered with the insulating coating 42 is crimped with the second crimp portion 13, which is located on the rear side. In the embodiment shown in the diagrams, two electric wires 40 are crimped together. The term "crimped together" as used herein refers to a state in which a plurality of electric wires 40 that are aligned in parallel or stacked together are crimped with the common crimp portion 11 of the terminal fitting 10. The number of electric wires 40 to be crimped together is not limited to two. A configuration may also be employed in which a single electric wire 40 is crimped alone. It should be noted that, in the case where the crimp portion 11 does not include the first crimp portion 12 as in the case of the terminal fitting 10' shown in FIG. 3, a welded portion 41a need only be formed by welding, using ultrasonic welding or the like, the conductor 41 exposed from the insulating coating 42 to a region on the bottom surface 11a on the front side with respect to the second crimp portion 13. Also in this case, the conductors 41 of a plurality of electric wires 40 that are aligned in parallel or are stacked together may be welded to the common welded portion 41a on the bottom surface 11a, or the conductor 41 of a single electric wire 40 may be welded alone to the welded portion 41a on the bottom surface 11a.

The electric wire 40 is sealed from water in the connection portion where the terminal fitting 10 and the electric wire 40 are connected to each other. That is, the water sealing layer 20 and the covering layer 30 are provided in the region including the crimp portion 11 of the terminal fitting 10 with which the electric wire 40 is crimped and fixed. The water sealing layer 20 and the covering layer 30 are formed to cover at least the entire circumference of the entire region of the crimp portion 11 in the front-rear direction of the crimp portion 11. In the embodiment shown in the diagrams, the water sealing layer 20 and the covering layer 30 are formed around the entire circumference of the region from the intermediate position of the planar portion 16 that is located on the front side with respect to the leading end portion of the conductor 41 protruding forward from the crimp portion 11 to the intermediate position of the electric wire 40 extending rearward from the crimp portion 11. It is preferable that, in the portion at the end portion of the electric wire 40 from which the insulating coating 42 is removed, the water sealing agent forming the water sealing layer 20 not only covers the outer circumferences of the conductor 41 and the first crimp portion 12 (the welded portion 41a in the case where the terminal fitting 10' that does not include the first crimp portion 12 is used) but also permeates the spaces between the strands constituting the conductor 41.

It should be noted that a configuration may also be employed in which solder is arranged on the outer circumference of the conductor 41 and between the strands constituting the conductor 41, and then the water sealing layer 20 and the covering layer 30 are provided. The permeation of solder between the strands constituting the conductor 41 makes it possible to provide improved water sealing performance to the electric wire 40. For example, it is sufficient that the conductor 41 is soldered to the terminal fitting 10 around the first crimp portion 12 (or the welded portion 41a). Performing soldering at such a position makes it likely that solder permeates between the strands due to the capillary phenomenon. In addition, preventing solder from coming into contact with the insulating coating 42 makes it possible to avoid melting of the insulating coating 42 caused by the contact with the solder.

The electric wire 40 can be sealed from water due to the water sealing layer 20 covering the region including the crimp portion 11. In other words, even if water from the outside comes into contact with the surface of the grounding terminal 1 such as the surface of the fastened portion 15, it is possible to suppress the infiltration of the water into the electric wire 40, that is, the region between the conductor 41 and the insulating coating 42, and the regions between the strands constituting the conductor 41.

The covering layer 30 covers the outer circumference of the water sealing layer 20, and the water sealing agent forming the water sealing layer 20 is filled over the entire area inside the region covered with the covering layer 30. The covering layer 30 can physically protect the water sealing layer 20 and the crimp portion 11 with which the electric wire 40 is crimped and fixed.

Since the water sealing layer 20 and the covering layer 30 are formed by heating the heat-shrinkable tube with a water sealing agent 5 as mentioned above, the water sealing agent forming the water sealing layer 20 is distributed not only inside the covering layer 30 but also outside the covering layer 30. That is, when the heat-shrinkable tube with a water sealing agent 5 is heated, the volume of the space inside the heat-shrinkable tube 51 decreases due to the thermal shrinkage of the shrinkable tube 51, and therefore, a portion of the molten water sealing agent of the inner layer 52 does not stay inside the space covered with the covering layer 30 and is squeezed out to the outside of the covering layer 30. The water sealing agent that has been thus squeezed out solidifies on the front side of the covering layer 30 and forms a squeezed-out portion 21, and may also solidify in a state in which it hangs down due to gravity and form a hanging-down portion 22.

In this embodiment, the squeezed-out portion 21 is formed on the front side of the covering layer 30. That is, when the grounding terminal 1 is viewed from above (+z side) as in FIG. 1B, the water sealing agent forming the water sealing layer 20 is distributed up to the front side (+x side) with respect to the covering layer 30. A state in which the water sealing agent does not reach the front end of the covering layer 30 and the water sealing agent does not leak into the front side of the covering layer 30 when the grounding terminal 1 is viewed from above is referred to as "shrinkage". The state in which the squeezed-out portion 21 is formed as in this embodiment corresponds to a shrinkage-free state.

Furthermore, in this embodiment, the hanging-down length d is within the range of the stepped portion of the terminal fitting 10. One type of the hanging-down portion 22 is formed of the water sealing agent that hangs down and solidifies in a droplet shape under the planar portion 16 and covering layer 30 of the terminal fitting 10 as indicated by reference numeral 22(a) in FIGS. 1A and 1B, and the other is formed of the water sealing agent that hangs down and solidifies in a state in which it flows forward along the lower surface of the oblique portion 14 of the terminal fitting 10 as indicated by reference numeral 22(b). The hanging-down lengths d of the hanging-down portions 22 of these two forms are within the range of the stepped portion. That is, in the hanging-down portions 22 in both forms, the lower end portion (portion located the farthest in the −z side; position z1 in FIGS. 1A and 1B) of the water sealing agent that has solidified is located above (on the +z side of) the position of the lower end of the stepped portion, namely the position of the lower surface of the fastened portion 15 (position z2 in FIGS. 1A and 1B). It should be noted that the state in which the hanging-down length d of the hanging-down portion 22 is within the range of the stepped portion of the terminal fitting 10 encompasses a state in which the water sealing agent does not hang down from the planar portion 16 and the covering portion 30 and the hanging-down portion 22 is not formed.

As described in detail later, in the grounding terminal 1 and the wire harness 2 according to this embodiment, high water sealing performance can be obtained due to the squeezed-out portion 21 made of the water sealing agent being formed on the front side of the covering layer 30. In addition, the looseness of the bearing surface of the grounding terminal 1 is suppressed when the ground connection is established, thus making it possible to obtain high stability, due to the hanging-down length d of the hanging-down portion 22 that is made of the water sealing agent and is formed under the planar portion 16 and the covering layer 30 being within the range of the stepped portion of the terminal fitting 10.

Although there is no particular limitation on the applications of the grounding terminal 1 and the wire harness 2 according to this embodiment, they can be favorably used in portions of vehicles such as automobiles that may come into contact with water since they have high water sealing performance. The water sealing layer 20 can sufficiently suppress the infiltration of water into the electric wire 40 while a vehicle is being used or washed.

[Method for Manufacturing Wire Harness]

Here, a method for manufacturing the wire harness 2 by connecting the grounding terminal 1 to the end portion of the electric wire 40 will be briefly described.

When the wire harness 2 is manufactured, first, the electric wire 40 in which the insulating coating 42 is removed from the end portion is placed on the upper side of the bottom surface 11a of the crimp portion 11 of the terminal fitting 10. Then, the conductor 41 is covered with the crimp piece 12a of the first crimp portion 12 and crimped therewith. When the terminal fitting 10' that does not include the first crimp portion 12 is used, the exposed conductor 41 is welded to a portion of the bottom surface 11a located on the front side of the second crimp portion 13 using ultrasonic welding or the like. Furthermore, a region of the electric wire 40 on which the insulating coating 42 is formed is covered with the crimp piece 13a of the second crimp portion 13 and crimped therewith. Accordingly, the electric wire 40 is fixed to the terminal fitting 10 and thus connected thereto. The conductor 41 may be soldered to the terminal fitting 10 thereafter. This makes it possible to permeate solder between the strands constituting the conductor 41 and improve the water sealing performance of the electric wire 40. Soldering need only be performed at a position of the first crimp portion 12 or the welded portion 41a or thereabout.

Then, the heat-shrinkable tube with a water sealing agent 5 as shown in FIG. 4 is used to form the water sealing layer 20 and the covering layer 30 on a region from a position on the front side with respect to the conductor 41 to a position on the rear side with respect to the crimp portion 11. Specifically, while the terminal fitting 10 is held such that the fastened portion 15 of the terminal fitting 10 is located on the lower side in the gravity direction and the crimp portion 11 is located on the upper side, the portion including the crimp portion 11 of the terminal fitting 10 to which the electric wire 40 is connected is covered with the heat-shrinkable tube with a water sealing agent 5 as indicated by a dot-and-dash line in FIG. 1A. In this state, the heat-shrinkable tube with a water sealing agent 5 is heated.

Figure 5:
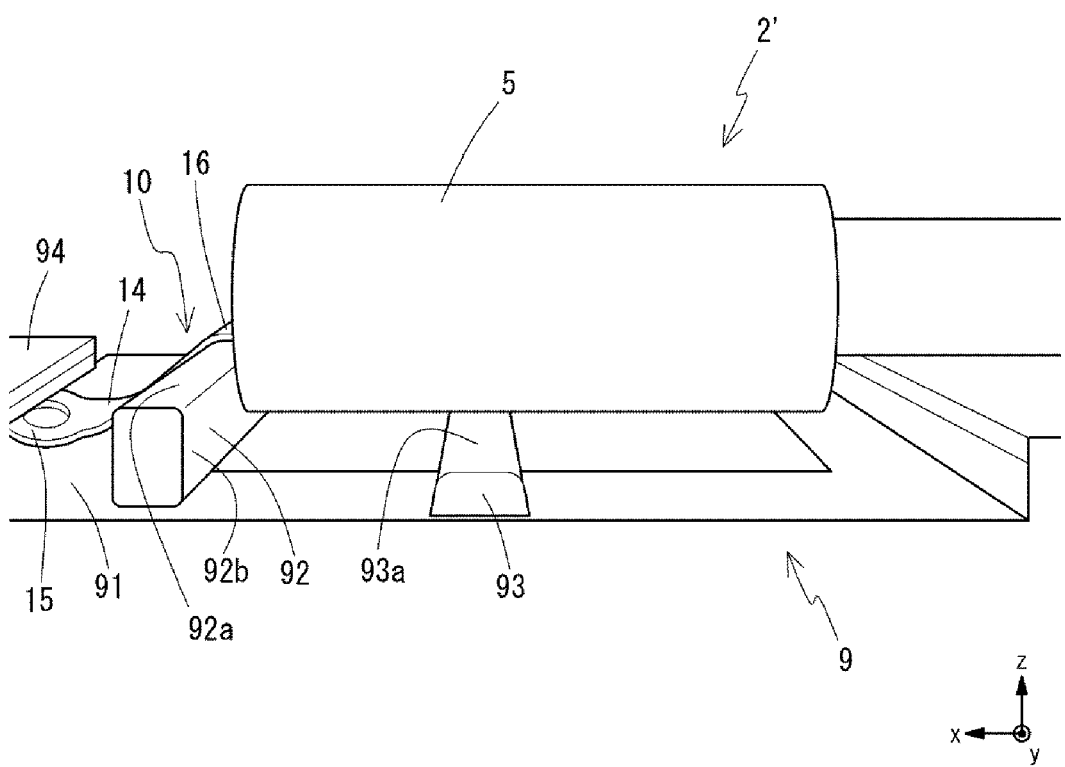
FIG. 5 is a perspective view of the end portion of a harness precursor held by a jig.

It is preferable to use a jig to position the heat-shrinkable tube with a water sealing agent 5 when the heat-shrinkable tube with a water sealing agent 5 is arranged at a predetermined position and heated. FIG. 5 shows an example of a jig. A jig 9 shown in FIG. 5 includes a leading end placement portion 91, an intermediate placement portion 92, a tube supporting portion 93, and a leading end holding portion 94. The jig 9 can be used to hold a harness precursor 2' in a state in which the electric wire 40 is crimped and fixed with the crimp portion 11 of the terminal fitting 10 and a region including the crimp portion 11 is covered with the heat-shrinkable tube with a water sealing agent 5.

The jig 9 includes the leading end placement portion 91, the intermediate placement portion 92, and the tube supporting portion 93 in that order from the front side in the front-rear direction (x direction) of the harness precursor 2' held thereby. The jig 9 further includes the leading end holding portion 94 that is located above the leading end placement portion 91 and is spaced apart from the leading end placement portion 91 by a distance that is larger than the thickness of the terminal fitting 10.

The leading end placement portion 91 is formed as a surface on which the lower surface of the fastened portion 15 of the terminal fitting 10 included in the harness precursor 2' can be placed. The intermediate placement portion 92 is arranged on the rear side of the leading end placement portion 91, and includes an upper surface 92a that is located above the surface of the leading end placement portion 91. The position and height of the leading end placement portion 91 are set such that the upper surface 92a of the intermediate placement portion 92 is in contact with the lower surface of the planar portion 16 in the state in which the fastened portion 15 of the terminal fitting 10 is placed on the leading end placement portion 91.

The tube supporting portion 93 is arranged on the rear side of the intermediate placement portion 92, and includes an upper surface 93a that is located above the surface of the leading end placement portion 91 and below the upper surface 92a of the intermediate placement portion 92. The position of the tube supporting portion 93 in the front-rear direction is set at a position that corresponds to the intermediate portion of the heat-shrinkable tube with a water sealing agent 5 in the state in which the fastened portion 15 and planar portion 16 of the terminal fitting 10 are respectively placed on the surface of the leading end placement portion 91 and the upper surface 92a of the intermediate placement portion 92, and the front end edge of the heat-shrinkable tube with a water sealing agent 5 is brought into contact with a rear end surface 92b of the intermediate placement portion 92. The height of the tube supporting portion 93 is set such that the upper surface 93a of the tube supporting portion 93 comes into contact with the lower portion of the heat-shrinkable tube with a water sealing agent 5, and the heat-shrinkable tube with a water sealing agent 5 can be lifted up a position at which it is to be arranged due to gravity. Here, "position at which it is to be arranged due to gravity" refers to a position as high as the heat-shrinkable tube with a water sealing agent 5 into which a harness precursor 92' is inserted is arranged due to gravity if there is no tube supporting portion 93.

When the front-rear direction of the harness precursor 2' is aligned with the front-rear direction of the jig 9, and the lower surface of the fastened portion 15 of the terminal fitting 10 provided at the leading end of the harness precursor 2' is placed on the leading end placement portion 91 of the jig 9, the intermediate placement portion 92 and the tube supporting portion 93 come into contact with the planar portion 16 of the terminal fitting 10 and the heat-shrinkable tube with a water sealing agent 5, respectively, from below, and thus the harness precursor 2' is held stably. Since the leading end holding portion 94 comes into contact with the fastened portion 15 of the terminal fitting 10, the rotation of the harness precursor 2' is also inhibited. Furthermore, when the front end edge of the heat-shrinkable tube with a water sealing agent 5 is brought into contact with the rear end surface 92b of the intermediate placement portion 92, the heat-shrinkable tube with a water sealing agent 5 is positioned in the front-rear direction, and is also positioned in the vertical direction in the state in which it is lifted up by the tube supporting portion 93. In the state in which the harness precursor 2' is held by the jig 9 and the heat-shrinkable tube with a water sealing agent 5 is positioned as described above, the heat-shrinkable tube with a water sealing agent 5 is heated using a heater or the like.

When the heat-shrinkable tube with a water sealing agent 5 is heated, the water sealing agent (adhesive) forming the inner layer 52 melts and spreads on the terminal fitting 10, the conductor 41 exposed from the insulating coating 42, and the surface of the insulating coating 42, and comes into intimate contact therewith, and the heat-shrinkable tube 51, which is the outer layer, is thermally shrunk. When the heating is stopped and the heat-shrinkable tube with a water sealing agent 5 is allowed to cool, the water sealing agent solidifies. Then, the water sealing layer 20 formed of the water sealing agent that has solidified is arranged on the inner circumference of the covering layer 30 formed of the shrunk heat-shrinkable tube 51. At this time, as mentioned above, due to the shrinkage of the heat-shrinkable tube 51, a portion of the molten water sealing agent leaks to the outside of the covering layer 30 and forms the squeezed-out portion 21 and the hanging-down portion 22. It should be noted that it is preferable to set the length of the heat-shrinkable tube with a water sealing agent 5 before shrinkage to be relatively long in consideration of a reduction in the length (dimension in the front-rear direction) of the heat-shrinkable tube 51 during shrinkage such that the region from the front side with respect to the leading end of the conductor 41 to the rear side with respect to the crimp portion 11 can be covered with the water sealing layer 20 and the covering layer 30 formed after the heating.

[Distribution of Water Sealing Agent and Characteristics of Grounding Terminal]

As mentioned above, in the grounding terminal 1 according to this embodiment, the water sealing agent forming the water sealing layer 20 forms the squeezed-out portion 21 on the front side of the covering layer 30, and the hanging-down length d of the hanging-down portion 22 made of the water sealing agent is within the range of the stepped portion of the terminal fitting 10. This makes it possible to sufficiently cover the connection portion where the electric wire 40 and the terminal fitting 10 are connected to each other with the water sealing agent and thus achieve high water sealing performance as well as to suppress the looseness of the bearing surface of the grounding terminal 1 caused by the water sealing agent that hangs down when the ground connection is established.

(1) Formation of Squeezed-Out Portion and Water Sealing Performance

The fact that the squeezed-out portion 21 is formed on the front side of the covering layer 30 indicates that, when the heat-shrinkable tube with a water sealing agent 5 is heated to form the covering layer 30 and the water sealing layer 20, a portion of the molten water sealing agent cannot stay in the region on the interior side with respect to the front end of the covering layer 30 due to the shrinkage of the heat-shrinkable tube 51, which is the outer layer, and leaks up to the front side with respect to the covering layer 30. The water sealing agent that has been melted and has then solidified is continuously distributed from the region inside the covering layer 30 in which the water sealing layer 20 is formed to the region in which the water sealing layer that has leaked up to the outside of the covering layer 30 forms the squeezed-out portion 21. Accordingly, the fact that the squeezed-out portion 21 is formed on the front side of the covering layer 30 indicates that there is no shrinkage of the water sealing agent. That is, it is indicated that the water sealing layer 20 that reaches the front end edge of the covering layer 30 is formed instead of bringing about a state in which the water sealing layer 20 is formed only up to the position located on the rear side with respect to the front end edge of the covering layer 30.

Accordingly, the fact that the squeezed-out portion 21 is formed indicates that, as shown in FIGS. 1A and 1B, in the region covered with the covering layer 30, the entire connection portion where the electric wire 40 and the terminal fitting 10 are connected to each other, that is, the entire region in which the end portion of the electric wire 40 is crimped with the crimp portion 11 of the terminal fitting 10, including the leading end portion of the electric wire conductor 41 exposed from the insulating coating 42 is covered with the water sealing layer 20. Therefore, it is indicated that the water sealing layer 20 that provides high water sealing performance to the electric wire 40 is formed.

If the squeezed-out portion 21 is not formed and there is shrinkage of the water sealing agent, a portion of the connection portion where the electric wire 40 and the terminal fitting 10 are connected to each other is not covered with the water sealing agent, and thus there is a possibility that sufficient water sealing performance cannot be obtained. For example, if the leading end portion of the electric wire conductor 41 exposed from the insulating coating 42 is not sufficiently covered with the water sealing layer 20, water may infiltrate into a region between the electric wire conductor 41 and the insulating coating 42, or the regions between the strands constituting the electric wire conductor 41. In general, the inside of the covering layer 30 formed through shrinkage of heat-shrinkable polymer cannot be visually confirmed, but if it is visually confirmed that the squeezed-out portion 21 is formed on the front side of the covering layer 30 when the grounding terminal 1 is observed from above as shown in FIG. 1B, it can be confirmed with a high degree of probability that the water sealing agent is reliably filled into the region inside the covering layer 30 up to the position of the front end edge of the covering layer 30, and the water sealing layer 20 that sufficiently cover even the leading end portion of the electric wire conductor 41.

When the heat-shrinkable tube with a water sealing agent 5 is heated to form the covering layer 30 and the water sealing layer 20, melting the water sealing agent in a state in which a sufficient amount of water sealing agent of the inner layer 52 is arranged in a region that covers the leading end portion of the electric wire conductor 41 fixed with the crimp portion 11 of the terminal fitting 10, and a region on the front side with respect thereto makes it likely that the squeezed-out portion 21 is formed on the front side of the covering layer 30. However, if the water sealing agent is melted in a state in which the heat-shrinkable tube with a water sealing agent 5 is arranged at a lower position due to gravity, the water sealing agent melted inside the heat-shrinkable tube 51, which is the outer layer, is likely to be distributed at a lower position relative to the terminal fitting 10 and the electric wire 40, and thus a sufficient amount of water sealing agent is less likely to be distributed around the electric wire conductor 41 arranged at a higher position relative to the bottom surface 11a of the terminal fitting 10. As a result, the squeezed-out portion 21 that can be visually confirmed from above is less likely to be formed on the front side of the covering layer 30. To address this, the heat-shrinkable tube with a water sealing agent 5 is heated in a state in which it is lifted up using the jig 9 including the tube supporting portion 93 as shown in FIG. 5, or the like, and the water sealing agent is melted. This makes it likely that the leading end portion of the electric wire conductor 41 is covered with a sufficient amount of water sealing agent, and the water sealing agent is distributed up to the front side of the covering layer 30 to form the squeezed-out portion 21.

Moreover, when the heat-shrinkable tube with a water sealing agent 5 is heated to melt the water sealing agent of the inner layer 52, increasing the fluidity of the water sealing agent makes it likely that the molten water sealing agent is squeezed out due to the shrinkage of the heat-shrinkable tube 51, which is the outer layer, and the squeezed-out portion 21 is formed on the front side of the terminal fitting 10. In order to increase the fluidity of the water sealing agent, the heat-shrinkable tube with a water sealing agent 5 need only be heated to a high temperature. In a common heat-shrinkable tube with a water sealing agent 5, a temperature at which the water sealing agent has a fluidity that is sufficient enough for the water sealing agent to flow on the surface of the terminal fitting 10 is higher than a temperature at which the heat-shrinkable tube 51, which is the outer layer, is shrunk, and it is thus preferable to heat the heat-shrinkable tube with a water sealing agent 5 to a temperature higher than the temperature at which the heat-shrinkable tube 51 is shrunk. For example, it is sufficient that heating is performed at a temperature that is approximately 25° C. to 55° C. higher than the temperature at which the heat-shrinkable tube 51 is shrunk. In this specification, the temperature at which the heat-shrinkable tube is shrunk refers to a temperature at which the shrinkage ratio of the heat-shrinkable tube in the inside diameter direction (amount of change in the inside diameter due to thermal shrinkage) reaches 75%. When the heat-shrinkable tube 51 contains a crosslinked polyolefin and the inner layer 52 contains a hot melt adhesive, it is sufficient that the heat-shrinkable tube with a water sealing agent 5 is typically heated at 160 to 190° C.

Furthermore, providing the planar portion 16 between the crimp portion 11 and the oblique portion 14 in the terminal fitting 10 makes it likely that the water sealing layer 20 is easily formed up to the front side of the electric wire conductor 41 crimped and fixed with the crimp portion 11 and the squeezed-out portion 21 is formed. In particular, setting a length L of the planar portion 16, namely the distance between the crimp portion 11 and the stepped portion, to 10 mm or greater makes it possible to sufficiently cover, with the water sealing layer 20 and the covering layer 30, the leading end of the electric wire conductor 41 protruding forward from the crimp portion 11, and to form the squeezed-out portion 21 that can be visually confirmed with ease on the front side of the covering layer 30. It should be noted that, when the terminal fitting 10' that does not include the first crimp portion 12 as shown in FIG. 3 is used, the length L of the planar portion 16 is defined as the distance between a position at which the leading end of the welded portion 41a is located and the stepped portion.

In particular, when the heat-shrinkable tube with a water sealing agent 5 is used to form the water sealing layer 20 and the covering layer 30, thermally shrinking the heat-shrinkable tube with a water sealing agent 5 arranged such that the front end edge is located on the planar portion 16 as indicated by a dot-and-dash line in FIG. 1A makes it possible to form the water sealing layer 20 and the covering layer 30 with a portion having a sufficient length being left on the front side of the crimp portion 11 and to form the squeezed-out portion 21 that can be visually confirmed with ease from a surplus water sealing agent. For example, when the lengths of portions of the water sealing layer 20 and covering layer 30 to be left on the front side of the crimp portion 11 after shrinkage are 5 mm or greater, the thermal shrinkage ratio (ratio of change in the length due to thermal shrinkage) of the heat-shrinkable tube 51 is set to 10%, and the cutting error of the heat-shrinkable tube with a water sealing agent 5 is set to 1 mm, the water sealing layer 20 and the covering layer 30 as desired can be formed from a position spaced forward from the front end of the crimp portion 11 by 5 mm or greater by providing the planar portion 16 having a length of 10 mm, arranging the heat-shrinkable tube with a water sealing agent 5 such that its front end edge is aligned with the front end edge of the planar portion 16, and thermally shrinking the heat-shrinkable tube with a water sealing agent 5. On the other hand, the length L of the planar portion 16 is suppressed to preferably 20 mm or smaller, and more preferably 15 mm or smaller, from the viewpoint of the space-saving properties of the grounding terminal 1 and a reduction in cost.

(2) Hanging-Down Length of Water Sealing Agent and Looseness of Bearing Surface

In the grounding terminal 1 according to this embodiment, the stepped portion is formed in the terminal fitting 10, and the hanging-down length d of the hanging-down portion 22 made of the water sealing agent is within the range of the stepped portion, thus making it possible to suppress the looseness of the bearing surface of the grounding terminal 1 when the grounding terminal 1 is connected to the grounding surface and to improve the connection stability of the grounding terminal 1.

If the hanging-down length d of the water sealing agent is large, and the hanging-down portion 22 is not within the range of the stepped portion of the terminal fitting 10, that is, if the water sealing agent that hangs down reaches a position located below the position of the fastened portion 15 (position z2), the hanging-down portion 22 comes into contact with the grounding surface when the grounding terminal 10 is connected to the grounding surface via the fastened portion 15. Thus, the fastened portion 15 cannot be brought into contact with the grounding surface in a planar manner, and the bearing surface of the grounding terminal 1 becomes loose. In contrast, if the hanging-down length d of the water sealing agent in the hanging-down portion 22 is within the range of the stepped portion of the terminal fitting 10, the flat state of the lower surface of the fastened portion 15 is maintained, thus making it possible to bring the fastened portion 15 into contact with the grounding surface in a planar manner and to establish the connection using a fastening member without the looseness of the bearing surface. As a result, ground connection using the grounding terminal 1 can be stably established with high reliability.

Furthermore, if the hanging-down portion 22 is not within the range of the stepped portion, force is applied to the hanging-down portion 22 in the state in which the hanging-down portion 22 is in contact with the grounding surface and the fastened portion 15 of the terminal fitting 10 when the grounding terminal 1 is fastened using a fastening member. Thus, the water sealing agent forming the hanging-down portion 22 may come off or be damaged. If the water sealing layer 20 inside the covering layer 30 that covers the connection portion where the electric wire 40 and the terminal fitting 10 are connected to each other also comes off or is damaged due to the water sealing agent coming off or being damaged, the water sealing performance of the water sealing layer 20 may be impaired. In contrast, if the hanging-down length d of the water sealing agent is within the range of the stepped portion of the terminal fitting 10, the hanging-down portion 22 is less likely to come into contact with other members when the ground connection of the grounding terminal 1 is established, and thus the water sealing layer 20 is less likely to come off or be damaged. Accordingly, the squeezed-out portion 21 is formed on the front side of the covering layer 30, and high water sealing performance achieved due to the connection portion where the terminal fitting 10 and the electric wire 40 are connected to each other being sufficiently covered with the water sealing agent is likely to be maintained. Even if the hanging-down portion 22 is formed, it is not necessary to remove the hanging-down portion 22 in order to suppress the looseness of the bearing surface and ensure water sealing performance as long as the hanging-down length d is within the range of the stepped portion of the terminal fitting 10.

When the heat-shrinkable tube with a water sealing agent 5 is heated in a state in which it is lifted up using the jig 9 including the tube supporting portion 93 as mentioned above, or the like, and the water sealing agent is melted, the squeezed-out portion 22 is likely to be formed. At the same time, it is likely that the hanging-down length d of the water sealing agent in the hanging-down portion 22 is kept small and made to be within the stepped portion of the terminal fitting 10. Making the position at which the water sealing agent is melted higher makes it less likely that the molten water sealing agent hangs down to a lower position before it solidifies. Therefore, the hanging-down portion 22 is likely to be kept at a high position such that the hanging-down portion 22 is kept within the range of the stepped portion of the terminal fitting 10. When the heat-shrinkable tube with a water sealing agent 5 is positioned in a state in which it is lifted up, and is then heated, sufficient water sealing performance can be ensured without using an excessive amount of water sealing agent that forms a hanging-down portion 22 having a large hanging-down length d.

Moreover, it is preferable that the heating temperature of the heat-shrinkable tube with a water sealing agent 5 is increased from the viewpoint of increasing the fluidity of the molten water sealing agent and making it likely to form the squeezed-out portion 21 as mentioned above. However, if the fluidity of the water sealing agent is excessively increased, the water sealing agent is likely to hang down due to gravity, and the hanging-down portion 22 is less likely to be within the range of the stepped portion of the terminal fitting 10. Therefore, it is not preferable to heat the heat-shrinkable tube with a water sealing agent 5 to an excessively high temperature from the viewpoint of keeping the hanging-down length d of the hanging-down portion 22 within the range of the stepped portion of the terminal fitting 10. For example, it is preferable that the heat-shrinkable tube with a water sealing agent 5 is not heated to a temperature that is 65° C. or more higher than the temperature at which the heat-shrinkable tube 51, which is the outer layer, is shrunk. As mentioned above, the temperature at which the heat-shrinkable tube is shrunk refers to a temperature at which the shrinkage ratio of the heat-shrinkable tube in the inside diameter direction reaches 75%.

It is preferable to limit the hanging-down length d of the water sealing agent as the hanging-down portion 22 to 5.0 mm or smaller by using the jig 9, selecting the heating temperature of the heat-shrinkable tube with a water sealing agent 5, and the like. Thus, providing the stepped portion having a height D of at least 5.0 mm to the terminal fitting 10 makes it possible to suppress the looseness of the bearing surface and impairment of the water sealing performance caused by the water sealing agent that excessively hangs down. However, an excessive increase in the height D of the stepped portion results in an excessive increase in size of the grounding terminal 1 or an increase in cost of the material of the terminal fitting 10, and therefore, it is preferable to limit the height D of the stepped portion to 6.0 mm or smaller from the viewpoint of the space-saving properties and a reduction in cost. It should be noted that the height D of the stepped portion is measured as the distance in the vertical direction between the position of the lower end of the bottom surface 11a of the crimp portion 11 and the position of the lower end of the fastened portion 15.

(3) Contribution of Other Constitutive Parameters to Distribution of Water Sealing Agent There is no particular limitation on the dimensions of portions of the terminal fitting 10, and it is sufficient that they are set as appropriate based on the shape and dimensions of a conventional terminal fitting that is commonly used as a ground terminal. For example, it is sufficient that, based on a conventional and common terminal fitting having dimensions as described below, the terminal fitting 10 is designed to have similar dimensions. In this case, based on the usage of the water sealing agent that is estimated from the dimensions of portions of the terminal fitting 10, setting the length L of the planar portion 16 to 10 mm or greater as mentioned above makes it possible to effectively improve the water sealing performance due to the formation of the squeezed-out portion 21. In addition, even in the case where the height D of the stepped portion is set to 6.0 mm or smaller, the hanging-down length d of the hanging-down portion 22 is likely to be kept within the range of the stepped portion.

Width of terminal fitting 10 (W): 5.0 mm or greater and 9.0 mm or smaller. More preferably, 6.0 mm or greater and 7.5 mm or smaller.

Thickness of metal material constituting terminal fitting 10: 0.5 mm or greater and 3.0 mm or smaller. More preferably, 1.0 mm or greater and 1.2 mm or smaller.

Cross-sectional area of conductor to be crimped: 2 mm$^2$ or greater and 20 mm$^2$ or smaller as nominal cross-sectional area. More preferably, 5 mm$^2$ or greater and 17 mm$^2$ or smaller. It should be noted that, in the case where a plurality of electric wire 40 are crimped together, the total of the nominal cross-sectional areas of all the electric wires 40 is set to such values. It is preferable that the number of electric wires 40 to be crimped is two or more and five or less.

Although the terminal fitting 10 including only one fastened portion 15 and only one oblique portion 14 is used in the description above, the terminal fitting 10 may have a configuration in which one or both types of a plurality of fastened portions 15 and a plurality of oblique portions 14 are arranged side by side as viewed in the front-rear direction, for example. It should be noted that the terminal fitting 10 including only one fastened portion 15 and only one oblique portion 14 has better space-saving properties and cost-reducing effect.

Regarding the heat-shrinkable tube with a water sealing agent 5 to be used to form the water sealing layer 20 and the covering layer 30, when the amount of water sealing agent forming the inner layer 52 is converted to the thickness of the water sealing agent housed on the inner circumferential portion of the covering layer 30, namely the water sealing agent housed on the inner circumferential portion of the heat-shrinkable tube 51 that has shrunk, the converted value is preferably 0.5 mm or greater and 1.5 mm or smaller. Here, the amount of water sealing agent is converted to the thickness in a state in which the water sealing agent that stays inside the covering layer 30 after the heat-shrinkable tube 51 has shrunk and the water sealing agent that is squeezed out from the covering layer 30 are arranged together on the inner circumferential portion of the covering layer 30. Setting the value obtained by converting the amount of water sealing agent in this way to 0.5 mm or greater, preferably 0.7 mm or smaller, more preferably 1.0 mm or greater, and even more preferably 1.2 mm or smaller makes it likely to form the water sealing layer 20 capable of providing sufficient water sealing performance to the electric wire 40. On the other hand, setting the value obtained by converting the amount of water sealing agent in that way to 1.5 mm or smaller makes it possible to reduce the amount of water sealing agent that is squeezed out from the covering layer 30 during thermal shrinkage and forms the hanging-down portion 22. When the amount of water sealing agent is expressed as the volume per millimeter of the length of the heat-shrinkable tube 51 that has shrunk, the converted value is preferably set to 5 mm$^3$ or greater, more preferably 15 mm$^3$ or greater, even more preferably 30 mm$^3$ or greater, and even more preferably 40 mm$^3$ or greater. In addition, such a volume is preferably set to 50 mm$^3$ or smaller.

It is preferable that the heat-shrinkable tube 51 having a thermal shrinkage ratio of 1% or more and 30% or less is used, and the heat-shrinkable tube 51 is thermally shrunk at such a thermal shrinkage ratio to form the covering layer 30. Here, the thermal shrinkage ratio refers to a ratio of change in the length of the heat-shrinkable tube 51. That is, when the length of the heat-shrinkable tube 51 that is not shrunk is taken as A1, and the length of the heat-shrinkable tube 51 that is heated at 135° C. and sufficiently shrunk is taken as A2, the thermal shrinkage ratio is expressed as (A1−A2)/A1×100%. Forming the covering layer 30 by shrinking the heat-shrinkable tube 51 at a thermal shrinkage ratio of 1% or more makes it possible to bring the covering layer 30 into thoroughly areal contact with the water sealing layer 20 and makes it likely to form the squeezed-out portion 21 on the front side of the covering layer 30. On the other hand, suppressing the thermal shrinkage ratio to 30% or less makes it likely to suppress a case where an excessive amount of water sealing agent is squeezed out due to the heat-shrinkable tube 51 being thermally shrunk to form a hanging-down portion 22 that is not within the range of the stepped portion of the terminal fitting 10.

As mentioned above, the grounding terminal 1 and the wire harness 2 according to this embodiment have high water sealing performance and can suppress the looseness of the bearing surface, and can thus be favorably used in an automobile, but their application is not particularly limited. Also, there is no particular limitation on the mode of use. In addition to a mode in which the fastened portion 15 of a single grounding terminal 1 is fastened to the grounding surface using a single fastening member, a mode of use is also conceivable in which the fastened portions 15 of a plurality of grounding terminals 1 that are connected to respective electric wires 40 are stacked and fastened to the grounding surface using a common fastening member. However, the fastening stability thereof increases in the case where the fastened portion 15 of a single grounding terminal 1 is individually fastened using a single fastening member without stacking the fastened portions 15 of a plurality of grounding terminals 1, and therefore, in such a case, the effects of suppressing the bearing surface of the grounding terminal 1 and improving the fastening stability can be more effectively used by keeping the hanging-down portion 22 within the range of the stepped portion of the terminal fitting 10.

On the other hand, crimping a plurality of electric wires 40 together using the crimp portion 11 of a single terminal fitting 10 makes it possible to provide high water sealing performance to a large number of electric wires 40, or a plurality of electric wires 40 that have a large cross-sectional area of the conductor in total, and to establish stable ground connection due to the looseness of the bearing surface being suppressed. In the case where a plurality of electric wires 40 are crimped together, covering the end portions of all the electric wires 40 collectively with the heat-shrinkable tube with a water sealing agent 5 to provide the water sealing layer 20 and the covering layer 30 makes it possible to easily provide high water sealing performance to the electric wires 40.

EXAMPLES

Hereinafter, examples and comparative examples of the present invention will be described. The present invention is not limited to the following examples.

(Sample Production)

Terminal fittings having a shape shown in FIGS. 2A and 2B were produced using a tinned copper alloy material. At this time, each terminal fitting had a width W of 7.0 mm and a thickness of 1.0 mm. The stepped portion had a height D of 5.0 mm, and the planar portion had a length L of 10 mm.

Next, as shown in FIGS. 1A and 1B, electric wires in which the insulating coating was removed from the end portion were crimped and fixed with the crimp portion of the produced terminal fitting. In each sample, two electric wires were crimped together with a common terminal fitting. The conductors of the two electric wires had the same nominal sectional-area, and Table 1 shows the total value obtained from the two electric wires. Next, the conductors located at the first crimp portion were soldered to the terminal fitting. At this time, the insulating coating of the electric wire was not melted by the solder.

Then, a heat-shrinkable tube with a water sealing agent was used to form a water sealing layer and a covering layer. First, as shown in FIG. 1A, the heat-shrinkable tube with a water sealing agent was arranged covering a portion between the front end edge of the planar portion of the terminal fitting and a position located on the electric wire on the rear side with respect to the crimp portion. At this time, a jig including a tube supporting portion as shown in FIG. 5 was used, except for the case of Comparative Example 3. In the case of Comparative Example 3, such a jig was not used.

Then, a heater was used to heat the heat-shrinkable tube with a water sealing agent to the temperatures shown in Table 1. Thus, the heat-shrinkable tube was shrunk and the water sealing agent was melted. Wire harnesses were thus produced as samples according to examples and comparative examples. "SUMITUBE SA3-4" manufactured by Sumitomo Electric Fine Polymer, Inc. was used as the heat-shrinkable tube with a water sealing agent. The heat-shrinkable tube, which is the outer layer, contains cross-linked polyethylene as a main component, and the thermal shrinkage ratio is 10% or less. The temperature at which the heat-shrinkable tube is shrunk is 135° C. The water sealing agent is made of a hot melt adhesive. When the amount of adhesive is converted to the thickness of the adhesive housed on the inner circumferential portion of the heat-shrinkable tube that has shrunk, the converted value is 1.37 mm. When the amount of adhesive is converted to the volume per millimeter of the heat-shrinkable tube that has shrunk, the converted value is 44.2 $mm^3$. It should be noted that, as mentioned above, the shrinkage ratio of the heat-shrinkable tube refers to a ratio of change in the length due to thermal shrinkage.

(Evaluation Method)
State of Water Sealing Agent

The distribution states of the water sealing agent in the samples according to the examples and comparative examples produced above were evaluated. Specifically, each of the samples was observed from the lateral side, and the hanging-down length of the hanging-down portion formed of the water sealing agent that hung down from the planar portion of the terminal fitting or the covering layer was measured. Then, it was evaluated whether the hanging-down length was 5 mm or smaller or greater than 5 mm.

Furthermore, each of the samples were observed from above, and it was confirmed if the water sealing agent was squeezed out to the front side of the covering layer and formed a squeezed-out portion. Cases where the squeezed-out portion was visually confirmed were evaluated as "no shrinkage was present", and cases where the squeezed-out portion was not visually confirmed were evaluated as "shrinkage was present".

Looseness of Bearing Surface

It was examined whether or not the bearing surface was loose in each of the samples according to the examples and comparative examples. That is, the fastened portion of the terminal fitting was fastened and fixed to a flat grounding surface using a bolt and was then visually observed to confirm whether or not the bearing surface was loose. For each sample, five individuals produced in the same way were examined (n=5). Cases where the lower surfaces of the fastened portions of all the individuals were in contact with the grounding surface in a planar manner were evaluated as "bearing surface was not loose" (good). On the other hand, cases where at least one of the individuals had a portion that was not in contact with the ground surface and became loose was evaluated as "bearing surface was loose" (poor).

Water Sealing Performance

The water sealing performance of the samples according to the examples and comparative examples was evaluated using a leakage test. Specifically, the end portion of a sample including a portion in which the terminal fitting was exposed and a region covered with the covering layer and the water sealing layer was immersed in water, and air pressure of 98 kPa was applied from the other end of the insulated electric wire. Then, the vicinity of the covering layer was visually observed to confirm whether or not air bubbles were generated. For each sample, five individuals produced in the same way were examined (n=5). Cases where no air bubbles were generated in all the individuals were evaluated as "water sealing performance was high" (good), and cases where air bubbles were generated in at least one of the individuals were evaluated as "water sealing performance was low" (poor).

(Test Results)

The configurations of the wire harnesses of Examples 1 to 7 and Comparative Examples 1 to 3, and the evaluation results were summarized in Table 1 below.

TABLE 1

| | | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 |
|---|---|---|---|---|---|---|---|---|---|---|---|
| Configuration of wire harness | Total of nominal sectional-area of conductors [mm2] | 8.95 | | | | | 14.6 | | 8.95 | | |
| | Usage of jig | Yes | Yes | Yes | Yes | Yes | Yes | Yes | Yes | Yes | No |
| | Heating temperature [° C.] | 160 | 170 | 180 | 190 | 160 | 170 | 180 | 150 | 200 | 160 |
| Distribution of water sealing agent | Hanging-down length | ≤5 mm | ≤5 mm | ≤5 mm | ≤5 mm | ≤5 mm | ≤5 mm | ≤5 mm | ≤5 mm | ≥5 mm | ≤5 mm |
| | Shrinkage | No | No | No | No | No | No | No | Yes | No | Yes |
| Test result | Looseness of bearing surface | Good | Good | Good | Good | Good | Good | Good | Good | Poor | Good |
| | Water sealing properties | Good | Good | Good | Good | Good | Good | Good | Poor | Good | Poor |

As is clear from Table 1, in each of the examples prepared under the conditions where the jig including the tube supporting portion was used and the heating temperature was set to 160° C. to 190° C. when the heat-shrinkable tube with a water sealing agent was heated, the hanging-down length of the water sealing agent in the hanging-down portion was 5 mm or smaller irrespective of the cross-sectional area of the conductor of the electric wire, there was no shrinkage on the front side of the covering layer, and the squeezed-out portion was formed. Moreover, the bearing surface was not loose, and high water sealing performance was obtained. In contrast, in Comparative Example 1 prepared under the conditions where the heating temperature of the heat-shrinkable tube with a water sealing agent was as low as 150° C., and Comparative Example 3 prepared under the conditions where the jig including the tube supporting portion was not used when the heat-shrinkable tube with a water sealing agent was heated, there was shrinkage on the front side of the covering layer, a sufficient squeezed-out portion was not formed, and sufficient water sealing performance was not obtained. Moreover, in Comparative Example 2 prepared under the conditions where the heating temperature of the heat-shrinkable tube with a water sealing agent was as high as 200° C., the hanging-down length of the water sealing agent in the hanging-down portion was greater than 5 mm, and the bearing surface became loose.

It is understood from these results that heating the heat-shrinkable tube with a water sealing agent in the state in which the heat-shrinkable tube with a water sealing agent is lifted up using the jig including the tube supporting portion while taking care not to excessively heat it at a high temperature makes it possible to suppress a case where the water sealing agent having high fluidity excessively hangs down and limit the hanging-down length of the water sealing agent to 5 mm or smaller. This makes it possible to suppress a case where the hanging-down portion comes into contact with the grounding surface and thus the bearing surface becomes loose when the grounding terminal is connected to the grounding surface. On the other hand, it is understood that heating the heat-shrinkable tube with a water sealing agent while using the above-mentioned jig and ensuring a heating temperature that is high enough for the water sealing agent to flow makes it possible to form the squeezed-out portion by leaking the water sealing agent to the front side of the covering layer, and to form the water sealing layer without shrinkage. This makes it possible to sufficiently cover the electric wire up to the leading end portion of the conductor with the water sealing layer, and to obtain high water sealing performance.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A grounding terminal comprising a terminal fitting including a crimp portion for crimping and fixing an electric wire, and a fastened portion that is provided on the front lower side of the crimp portion and is to be connected to a grounding surface using a fastening member, the terminal fitting being provided with a stepped portion between the crimp portion and the fastened portion,
   wherein a covering layer is configured to be formed by thermally shrinking a heat-shrinkable tube including, on its inner circumferential portion, a water sealing agent to be used to cover at least the crimp portion of the terminal fitting and seal the electric wire from water,
   the water sealing agent is configured to be distributed up to the front side with respect to the covering layer as viewed from above, and
   a hanging-down length of the water sealing agent is within the range of the stepped portion.

2. The grounding terminal according to claim 1, wherein a hanging-down length of the water sealing agent is 5.0 mm or smaller.

3. The grounding terminal according to claim 1, wherein a height of the stepped portion is 6.0 mm or smaller.

4. The grounding terminal according to claim 1, wherein a distance between the crimp portion and the stepped portion is 10 mm or greater.

5. The grounding terminal according to claim 1, wherein the water sealing agent is used in such an amount that the water sealing agent housed on the inner circumferential portion of the covering layer has a thickness of 0.5 mm or greater and 1.5 mm or smaller.

6. The grounding terminal according to claim 1, wherein a cross-sectional area of a conductor of the electric wire is 2 mm$^2$ or greater and 20 mm$^2$ or smaller as a nominal cross-sectional area.

7. The ground terminal according to claim 1, wherein a thickness of a metal material constituting the terminal fitting is 0.5 mm or greater and 3.0 mm or smaller.

8. The grounding terminal according to claim 1, wherein the water sealing agent is made of a hot melt adhesive.

9. The grounding terminal according to claim 1, wherein the heat-shrinkable tube contains a crosslinked polyolefin.

10. The grounding terminal according to claim 1, wherein the covering layer is obtained by thermally shrinking the heat-shrinkable tube at a shrinkage ratio of 1% or more and 30% or less.

11. The grounding terminal according to claim 1, wherein the terminal fitting is made of a metal material including a tin plating layer on its surface.

12. The grounding terminal according to claim 1, wherein the terminal fitting includes only one fastened portion.

13. The grounding terminal according to claim 1, which is to be used in an automobile.

14. The grounding terminal according to claim 1, which is to be used without stacking the fastened portions of a plurality of the grounding terminals.

15. A wire harness comprising:
   a grounding terminal comprising a terminal fitting including a crimp portion for crimping and fixing an electric wire, and a fastened portion that is provided on the front lower side of the crimp portion and is to be connected to a grounding surface using a fastening member, the terminal fitting being provided with a stepped portion between the crimp portion and the fastened portion; and
   an electric wire,
   wherein a covering layer is configured to be formed by thermally shrinking a heat-shrinkable tube including, on its inner circumferential portion, a water sealing agent to be used to cover at least the crimp portion of the terminal fitting and seal the electric wire from water,
   the water sealing agent is configured to be distributed up to the front side with respect to the covering layer as viewed from above, a hanging-down length of the water sealing agent is within the range of the stepped portion, and an end portion of the electric wire is crimped and fixed with the crimp portion of the grounding terminal, and is covered with the covering layer.

16. The wire harness according to claim 15, wherein a plurality of the electric wires are crimped together using the crimp portion.

\* \* \* \* \*